United States Patent [19]

Uchinami

[11] Patent Number: 5,512,813
[45] Date of Patent: Apr. 30, 1996

[54] AC GENERATOR OUTPUT CONTROLLING APPARATUS AND METHOD

[75] Inventor: Masanobu Uchinami, Himeji, Japan

[73] Assignee: Mitsubishi Denki Kabushiki Kaisha, Tokyo, Japan

[21] Appl. No.: 162,282

[22] Filed: Dec. 7, 1993

[30]    Foreign Application Priority Data

Dec. 24, 1992 [JP] Japan .................................. 4-344277

[51] Int. Cl.⁶ ..................................................... H02H 7/06
[52] U.S. Cl. ................... 322/28; 322/99; 320/32
[58] Field of Search ........................................ 322/25, 28

[56]                References Cited

U.S. PATENT DOCUMENTS 4,379,990  4/1983  Sievers et al. ............................. 322/99
4,542,462  9/1985  Morishita ................................. 364/424

FOREIGN PATENT DOCUMENTS 266837   2/1990   Japan .

*Primary Examiner*—Steven L. Stephan
*Assistant Examiner*—Nicholas Ponomarenko
*Attorney, Agent, or Firm*—Sughrue, Mion, Zinn, Macpeak & Seas

[57]               ABSTRACT

An object of the present invention is to provide an AC generator output controlling apparatus which can appropriately control the generating operation timing of an AC generator and which can prevent excessive load on an internal combustion engine due to the unnecessary generating operation of the AC generator. The output controlling apparatus has an AC generator driven by an internal combustion engine to generate an AC voltage, a rectifier for converting the generated AC voltage into a DC voltage, a battery charged by the converted DC voltage, and a charge control circuit for determining a duty for a field current supplied to a field coil of the AC generator from the battery on the basis of a voltage deviation between the charged DC voltage and a predetermined target voltage of the battery, and stopping the supply of the field current when the duty amount is lower than a predetermined value.

6 Claims, 6 Drawing Sheets

DRIVE DUTY = 60%

| VOLT\rpm | 1000 | 1500 | 2000 | 2500 | 3000 | 3500 | 4000 |
|---|---|---|---|---|---|---|---|
| 12.5 | 1.34 | 1.12 | 1.08 | 1.03 | 0.99 | 0.95 | 0.92 |
| 13.5 | 1.28 | 1.07 | 1.03 | 0.98 | 0.94 | 0.91 | 0.88 |
| 14.5 | 1.2 | 1,0 | 0.96 | 0.92 | 0.88 | 0.85 | 0.82 |
| 15.5 | 1.14 | 0.95 | 0.91 | 0.87 | 0.84 | 0.81 | 0.78 | rpm = NUMBER OF REVOLUTIONS PER MINUTE OF ENGINE

AC GENERATOR OUTPUT CONTROLLING APPARATUS AND METHOD

BACKGROUND OF THE INVENTION

The present invention relates to an AC generator output controlling apparatus and method for controlling output of a battery charging AC generator which is driven by an internal combustion engine mounted on a vehicle or the like.

FIG. 7 is a block diagram showing the configuration of a conventional AC generator output controlling apparatus. In FIG. 7, an AC generator 1 has cylindrical armature coils 1a which make three-phase star connection, and a field coil 1b connected to a crank shaft of an internal combustion engine (not shown) so as to rotate in the armature coils 1a. A rectifier 2 converts the three-phase AC voltage generated between both ends of the armature coils 1a into a DC voltage. A battery 3 is charged by the DC voltage output from the rectifier 2 and supplies a DC current to each of electric circuits in a vehicle. A charge control circuit 4 compares the terminal voltage of the battery 3 with a predetermined charging target voltage (target voltage), and controls the operation of the AC generator 1 and charging of the battery 3 in the manner described below. If the terminal voltage 3A of the battery 3 is lower than the target voltage, a field current is supplied to the field coil 1b from the battery 3, and if the terminal voltage 3A is higher than the target voltage, the supply of the field current is stopped.

The operation of the conventional AC generator output controlling apparatus is described below. When the field coil 1b which receives the field current supplied from the battery 3 through the charge control circuit 4 is rotated with the start of the internal combustion engine (not shown), a three-phase AC voltage proportional to the intensity of the field current is generated between both ends of the armature coils 1a. After the three-phase AC voltage is converted into a DC voltage by the rectifier 2, the DC voltage is supplied between positive and negative electrodes of the battery 3 to charge the battery 3.

When a field current is then supplied to the field coil 1b by the charging voltage of the battery 3, a three-phase AC voltage is generated between the both ends of the armature coils 1a with rotation of the internal combustion engine. The three-phase AC voltage is converted into a DC voltage by the rectifier 2 to charge again the battery 3. However, if the number of revolutions per minute of the internal combustion engine is increased, the output voltage of the AC generator 1 is increased, and the output voltage of the rectifier 2 is also increased, thereby sometimes bringing the battery 3 into an over-charge state. The charge control circuit 4 thus compares the terminal voltage 3A of the battery 3 with the predetermined target voltage, and if it is decided that the terminal voltage 3A is higher than the target voltage, the output of the AC generator 1 is decreased by stopping the supply of the field current to the field coil 1b from the battery 3.

If the number of revolutions per minute of the internal combustion engine is decreased, or the load of the battery 3 is increased, the ratio of the discharging voltage to the charging voltage of the battery 3 is increased, thereby decreasing the terminal voltage 3A of the battery 3. When the terminal voltage 3A of the battery 3 is decreased to a value lower than the target voltage, the charge control circuit 4 supplies the field current to the field coil 1b from the battery 3 in order to increase the output voltage of the AC generator 1.

As described above, in the conventional AC generator output controlling apparatus, the field current is supplied to the field coil 1b from the battery 3 when the terminal voltage 3A of the battery 3 is decreased to a value lower than the target voltage, and the supply of the field current is stopped when the terminal voltage 3A of the battery 3 is increased to a value higher than the target voltage. Even in the state where there is substantially no need to drive the AC generator because the actual difference between the terminal voltage 3A of the battery and the target voltage is less than a value where the AC generator must be driven, when the terminal voltage 3A of the battery 3 is decreased to a value lower than the target voltage, power generation of the AC generator is immediately started. This causes the problem of producing rotational variations due to the effect on the driving torque of the internal combustion engine, and the problem of unnecessarily driving the AC generator and thus increasing the fuel consumption due to the excessive load on the internal combustion engine.

SUMMARY OF THE INVENTION

The present invention has been achieved for solving the above problems, and an object of the present invention is to provide an AC generator output controlling apparatus and method which can appropriately control the generating operation timing of an AC generator and which can prevent unnecessary driving of the AC generator so as to avoid the application of excess load to an internal combustion engine and an increase in the fuel consumption.

According to a first aspect of the present invention, an AC generator output controlling apparatus comprises a generator driven by an internal combustion engine to generate an AC voltage, a rectifier for converting the AC voltage generated by the generator into a DC voltage, a battery charged by the converted DC voltage, and control means for determining a control amount of a field current to be supplied to a field coil of the generator from the battery on the basis of the voltage deviation between the charging voltage of the battery and a predetermined target voltage of the battery and stopping the supply of the field current when the control amount is smaller than a predetermined amount.

According to a second aspect of the present invention, an AC generator output controlling method comprises the steps of detecting the terminal voltage of a battery which is charged by a generator driven by an internal combustion engine, determining a target voltage on the basis of the electric load of the internal combustion engine applied to the battery and the charging state of the battery, determining a voltage deviation between the charging voltage of the battery and the target voltage, determining a control amount of a field current supplied to a field coil of the generator from the battery on the basis of the voltage deviation, and stopping the supply of the field current when the control amount is lower than a predetermined value.

In the output controlling apparatus and method according to the first and second aspects, a control amount of the field current supplied to the field coil from the battery is determined on the basis of the voltage deviation between the predetermined target voltage and the DC voltage supplied to the battery on the basis of the output of the generator, and when the control amount is smaller than the predetermined value, since there is no need for power generation, the supply of the field current is stopped. Since the generating operation of the generator is stopped when there is substantially no need for the generating operation, it is possible to solve the problem of causing rotational variations due to the excess load on the internal combustion engine for driving the generator, and the problem of increasing the fuel consumption of the internal combustion engine.

According to a third aspect of the present invention, an AC generator output controlling apparatus comprises a generator driven by an internal combustion engine to generate an AC voltage, a rectifier for converting the AC voltage generated by the generator into a DC voltage, a battery charged by the converted DC voltage, and control means for determining a control amount of a field current to be supplied to a field coil of the generator from the battery on the basis of the voltage deviation between the charging voltage of the battery and a predetermined target voltage of the battery, stopping the supply of the field current when the voltage deviation is lower than a predetermined amount, and starting the supply of the field current when the voltage deviation becomes greater than the predetermined amount after the supply of the field current is stopped.

According to a fourth aspect of the present invention, an AC generator output controlling method comprises the steps of detecting the terminal voltage of a battery which is charged by a generator driven by an internal combustion engine, determining a target voltage on the basis of the electric load of the internal combustion engine applied to the battery and the charging state of the battery, determining a voltage deviation between the charging voltage of the battery and the target voltage, determining a control amount of a field current supplied to a field coil of the generator from the battery on the basis of the voltage deviation, and stopping supply of the field current when the voltage deviation is lower than a predetermined value and starting the supply of the field current when the voltage deviation becomes higher than the predetermined value after the supply of the field current is stopped.

In the output controlling apparatus and method according to the third and fourth aspects, the control amount of the field current supplied to the field coil from the battery is determined on the basis of the voltage deviation between the predetermined target voltage and the DC voltage supplied on the basis of the output of the generator, and when the voltage deviation is lower than the predetermined value, since there is no need for power generation, the supply of the field current is stopped, and the generating operation is started when the voltage deviation becomes the predetermined value after the supply of the field current is stopped. In addition to the above-described effects, it is thus possible to rapidly start power generation within a short time when power generation is required, thereby preventing discharge of the battery.

DESCRIPTION OF THE PREFERRED EMBODIMENTS

Embodiments of the present invention are described below with reference to the drawings.

Embodiment 1

Figure 1:
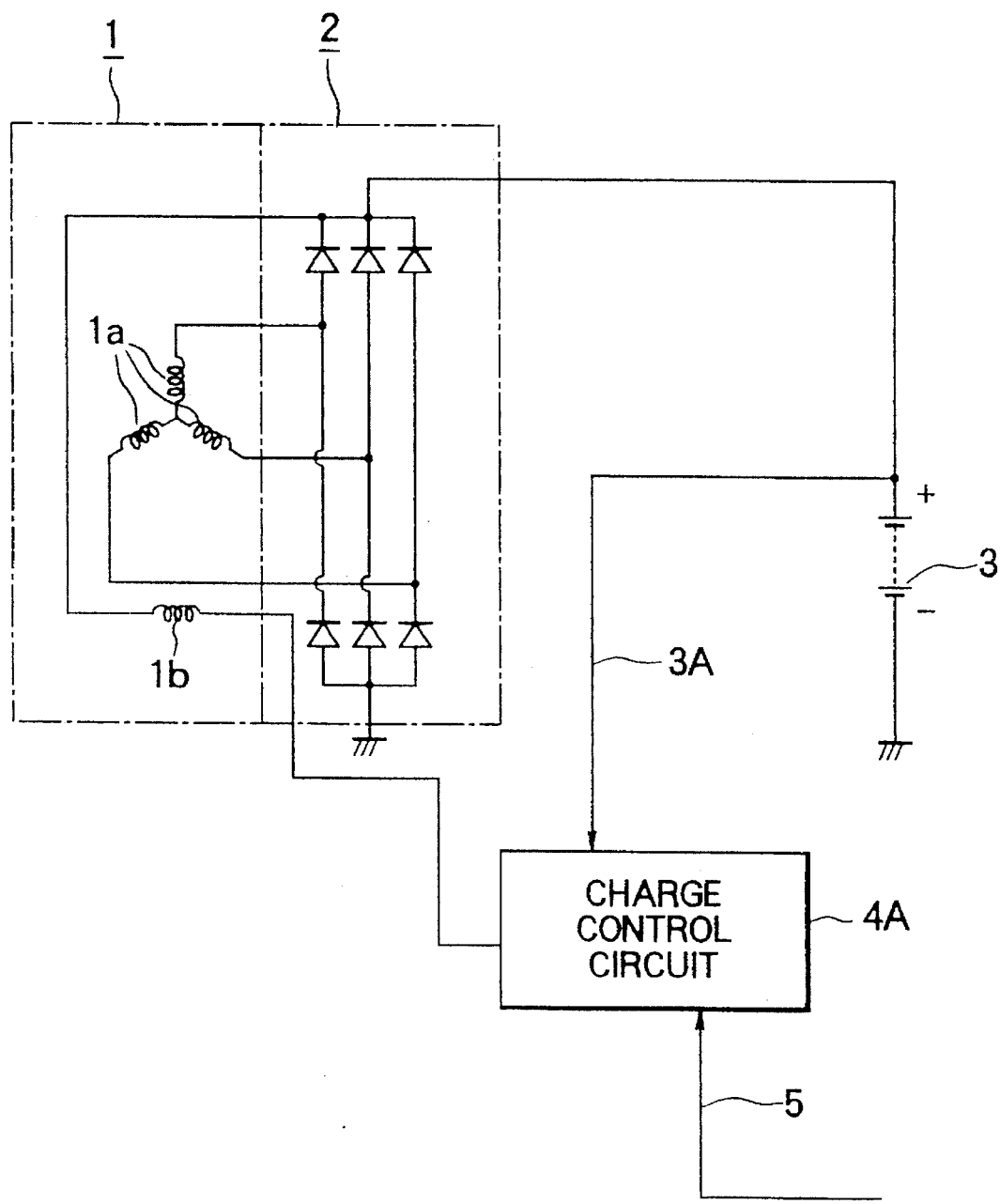
FIG. 1 is a block diagram showing the configuration of an AC generator output controlling apparatus in accordance with an embodiment of the present invention.
Figure 7:
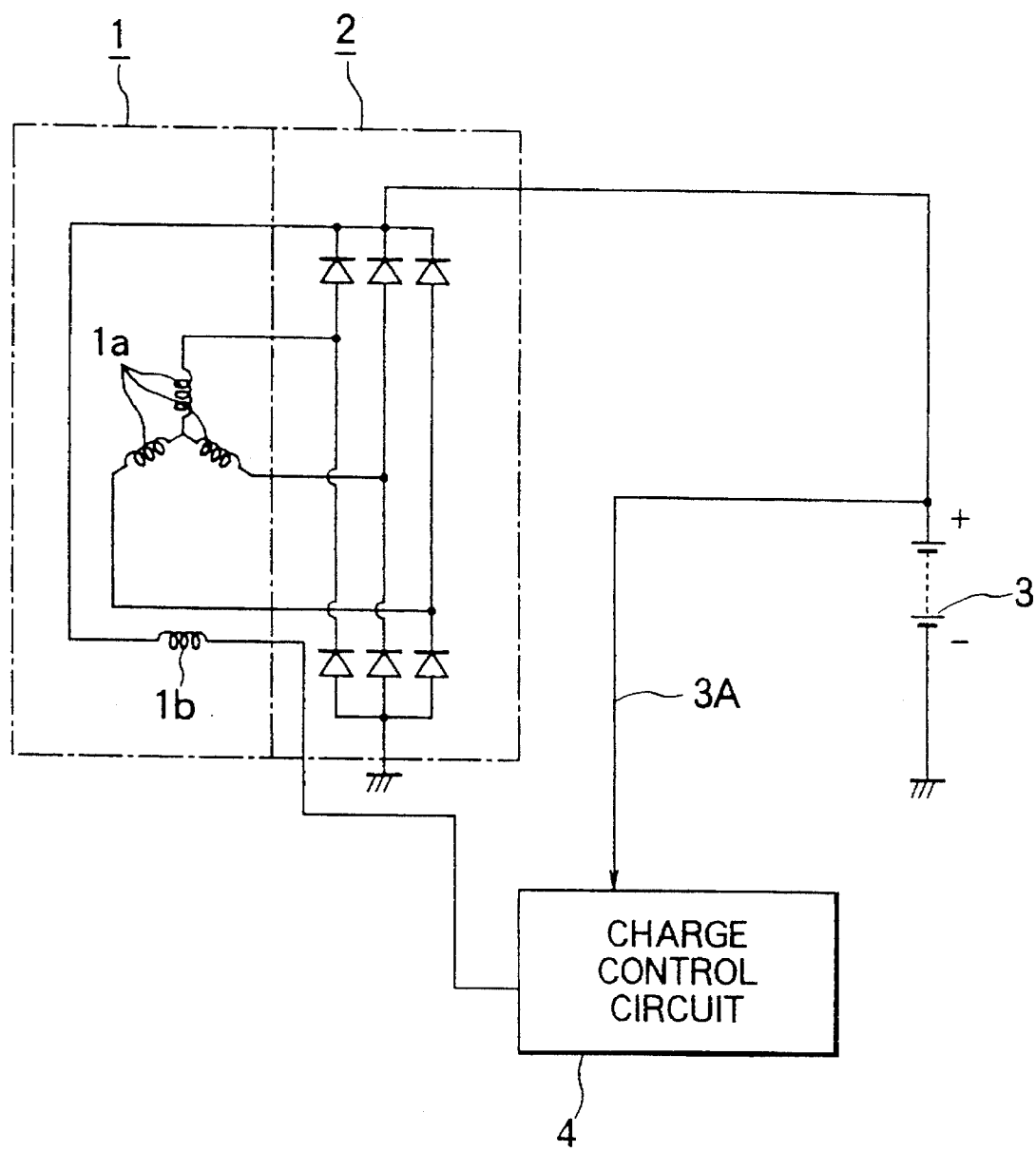
FIG. 7 is a block diagram showing the configuration of a conventional AC generator output controlling apparatus.

FIG. 1 shows an AC generator output controlling apparatus in accordance with a first embodiment of the present invention. This embodiment is different from the conventional example shown in FIG. 7 with respect to only the operation of a charge control circuit 4A which constitutes control means of the present invention. In the drawings, the same reference numerals respectively denote the same or equivalent portions. In FIG. 1, the charge control circuit 4A computes a basic duty as a control amount of a field current to be supplied to the field current $1b$ on the basis of a deviation between the terminal voltage 3A of the battery 3 and the predetermined target voltage (target voltage) of the battery 3.

The duty represents a ratio of the period of supply of the field current to the field coil $1b$ to the stop period of the supply. The amount of the field current increases as the ratio increases, and a duty of 0% represents that the supply of the field current is cut off.

The charge control circuit 4A sets a drive duty for determining a value of the actual field current by correcting the basic duty using each of the control elements below. If the drive duty set by correction is lower than a predetermined value, the charge control circuit 4A sets the drive duty to 0% and stops the generating operation. In addition, engine operating state signals 5 (for example, a crank signal generated synchronously with the revolutions of the internal engine so as to obtain the number of revolutions per minute of the engine, a signal indicating the intake air temperature, a signal indicating the vehicle speed and a signal indicating the amount of the intake air), which indicate the operating state of the engine detected by various sensors (not shown), are supplied to the charge control circuit 4A, and the charge control circuit 4A controls the amount of the fuel supplied to the internal combustion engine, the ignition timing, etc. on the basis of the engine operating state signals 5.

Figure 2:
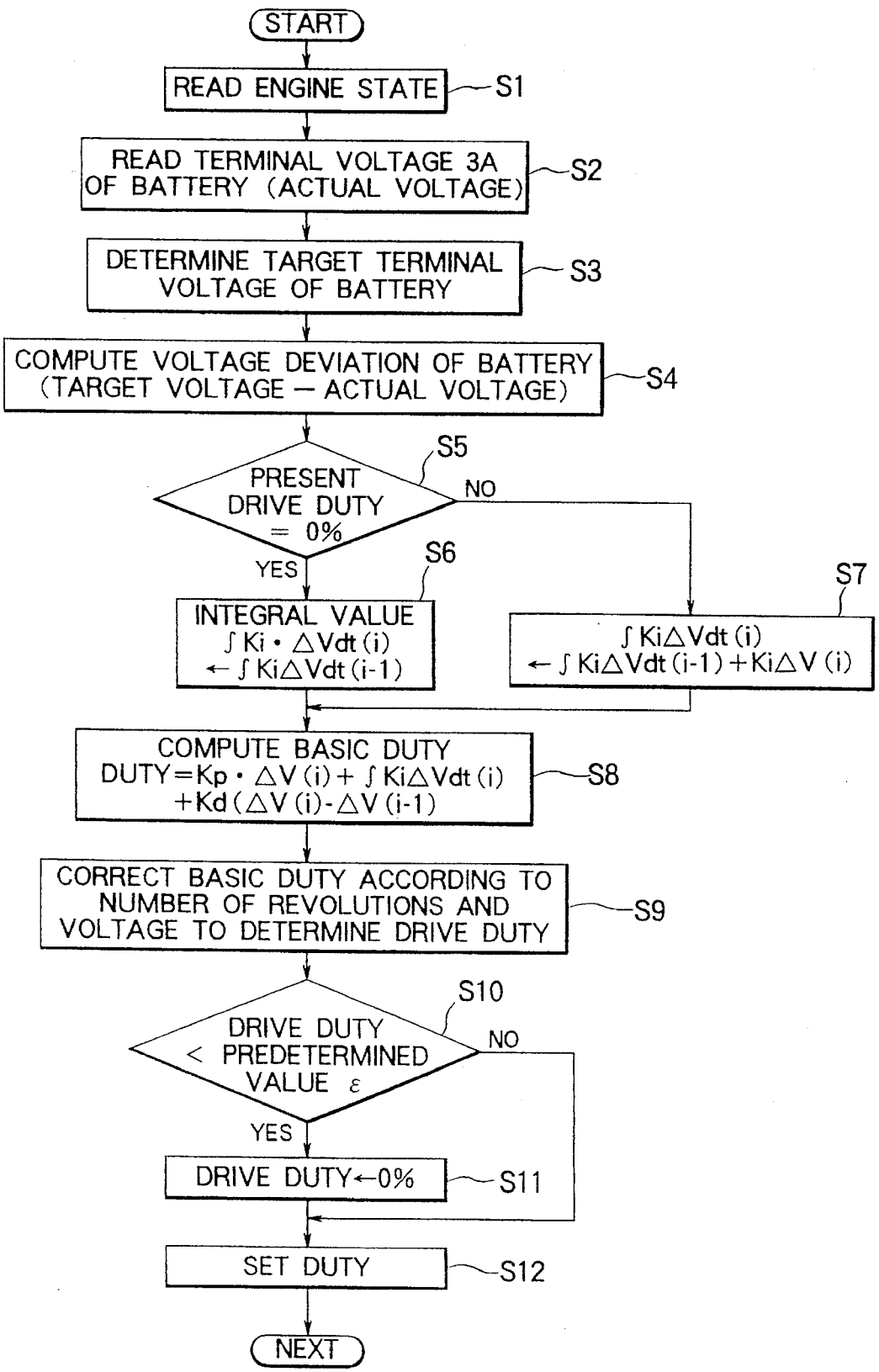
FIG. 2 is a flowchart showing the operation of this embodiment.

The operation of this embodiment, i.e., the AC generator controlling method of the present invention, is described below with reference to the flowchart shown in FIG. 2. The flowchart shows the operation of the charge control circuit 4A. The charge control circuit 4A first reads out the operating state of the internal combustion engine, for example, the number of revolutions per minute of the engine, the idle state (load state of the engine), the intake air temperature and so on, from the engine operating state signals 5 indicating the operating state of the internal combustion engine (not shown) (Step S1). The terminal voltage 3A (actual voltage) of the battery 3 is then read out (Step S2). An optimum target voltage is then determined from the engine operating state of the internal combustion engine, which is read out in Step S1, on the basis of the electric loads of the internal combustion engine and various auxiliaries and the charging state of the battery 3 (Step S3).

After the target voltage is determined, a battery voltage deviation (voltage deviation) $\Delta V$ (i) which represents a deviation between the actual voltage and the target voltage is computed (Step S4). The value of the drive duty (the initial value is set to zero) set in the previous program processing cycle is read in Step S11 below. If the drive duty is 0% (Step S5), it is decided that the AC generator 1 does not currently generate electricity, and the integral value ($\int Ki\Delta Vdt$ (i)) of the voltage deviation $\Delta V$ (i) is replaced by the integral value ($\int Ki\Delta Vdt$ (i–1)) of the previous voltage deviation $\Delta V$ (i–1) (Step S6).

However, if the drive duty is not 0%, and if it is decided that the AC generator 1 currently generates electricity, then the integral value ($\int Ki\Delta Vdt$ (i)) of the voltage deviation $\Delta V$ (i) is computed according to the following equation (Step S7):

$$\int Ki\Delta Vdt(i) = \int Ki\Delta Vdt(i-1) + \int Ki\Delta Vdt(i)$$

After the integral value ($\int Ki\Delta Vdt$ (i)) of the voltage deviation $\Delta V$ (i) is computed, the basic duty (Duty) of the field coil 1b is computed by the following equation according to the PID control method (Step S8):

$$Duty = Kp \cdot \Delta V(i) + \int Ki\Delta Vdt(i) + Kd \cdot (\Delta V(i) - \Delta V(i-1))$$

wherein Kp is a proportional gain, Ki is an integral gain and Kd is a differential gain.

After such a basic duty is computed, the basic duty is corrected on the basis of the number of revolutions per minute read in Step S1 and the actual voltage read in Step S2 and is then set as a drive duty (Step S9). The purpose of the correction processing is to compensate for the change in the output voltage or output current of the AC generator 1 caused by a change in the number of revolutions per minute of the internal combustion engine or the AC generator 1, and the change in the field current supplied to the field coil 1b, which is caused by a change in the terminal voltage 3A of the battery 3.

Figures 3, 4:
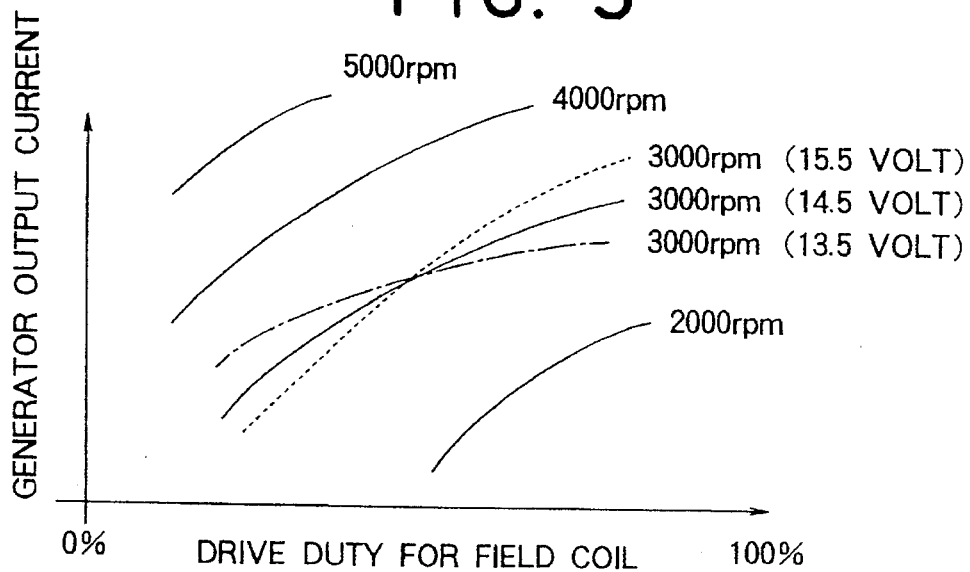
FIG. 3 is a graph showing the relation between the AC generator output current and the drive duty for a field coil.
FIG. 4 is a table showing examples of correction factors for a basic duty which were predetermined in correspondence with the number of revolutions per minute per minute (rpm) of an engine and the drive duty when the drive duty was 60%.

For example, the output current (voltage) of the AC generator 1, the number of revolutions per minute of the AC generator 1 (=k×number of revolutions per minute of engine wherein k is a proportional constant), the terminal voltage 3A of the battery 3 and the drive duty of the field coil 1b have the relation shown in FIG. 3. Namely, the output current of the AC generator 1 increases as the number of revolutions per minute of the AC generator 1 increases and the drive duty of the field coil 1b increases. Even when the number of revolutions per minute of the AC generator 1 is the same, if the terminal voltage 3A of the battery 3 changes, the relation between the output current of the AC generator 1 and the drive duty of the field coil 1b also changes.

In the present invention, in order to obtain a substantially constant output current (voltage) even if the number of revolutions per minute of the AC generator 1 or the terminal voltage 3A of the battery 3 changes, the correction factors for the number of revolutions per minute of the AC generator 1 and for the terminal voltage 3A of the batter 3 are thus previously computed for each drive duty of the field coil 1b (for example, each time the drive duty increases by 10% within the range of 10% to 100%), and are stored as data in a storage element (ROM) or the like in the charge control circuit 4A. An appropriate correction factor is read according to the number of revolutions per minute of the AC generator 1 and the terminal voltage 3A of the battery 3, and the basic duty is multiplied with the read correction factor to determine the drive duty. FIG. 4 shows an example of a table of the correction factors when the drive duty is 60%.

After the drive duty is set, a decision is made as to whether or not the drive duty is smaller than the predetermined value $\epsilon$ (Step S10). If the drive duty is smaller than the predetermined value $\epsilon$, the drive duty is set to 0%, and the operation of the AC generator 1 is substantially stopped by cutting off the field current (Step S11). However, if it is decided that the drive duty is greater than the predetermined value $\epsilon$, the field current with a frequency fixed at, for example, 200 Hz, is supplied to the field coil 1b on the basis of the voltage required for charging the battery 3 (Step S12). In this way, even if the terminal voltage 3A of the battery 3 is decreased to a value lower than the target voltage, when the drive duty is smaller than the predetermined value $\epsilon$, the field current is not supplied to the field coil 1b. Even when the terminal voltage 3A of the battery 3 is decreased to a value lower than the target voltage, therefore, the generating operation of the AC generator 1 is not immediately started. The field current is not supplied unless the drive duty exceeds the predetermined value $\epsilon$, i.e., until the terminal voltage 3A is decreased to a value lower than the target voltage by an amount greater than the predetermined value. When the terminal voltage 3A is decreased to a value lower than the target voltage, thus, no rotational variation is easily caused due to the effect on the drive torque of the internal combustion engine, and the AC generator is not unnecessarily driven, thereby preventing the fuel consumption from being increased due to the excessive load on the internal combustion engine.

Embodiment 2

In Embodiment 1, when the drive duty is smaller than the predetermined value $\epsilon$, the operation of the AC generator 1 is substantially stopped by setting the drive duty to 0%, and the generating operation of the AC generator 1 is started when the drive duty exceeds the predetermined value $\epsilon$. A little time is thus required from the time the difference between the terminal voltage 3A of the battery 3 and the target voltage, i.e., the voltage deviation $\Delta V$ (i), exceeds the predetermined value $\epsilon 1$ to the time the drive duty exceeds the predetermined value $\epsilon$, a delay occurs between the time the voltage deviation $\Delta V$ (i) exceeds the predetermined value $\epsilon 1$ and the time the generating operation of the AC generator 1 is started.

In Embodiment 2, although the drive duty is set to 0 % when the voltage deviation $\Delta V$ (i) is smaller than the predetermined value $\epsilon 1$, and the drive duty is smaller than the predetermined value $\epsilon$, the operation of the AC generator 1 is immediately started when the voltage deviation $\Delta V$ (i) becomes greater than the predetermined value $\epsilon 1$.

Figure 5:
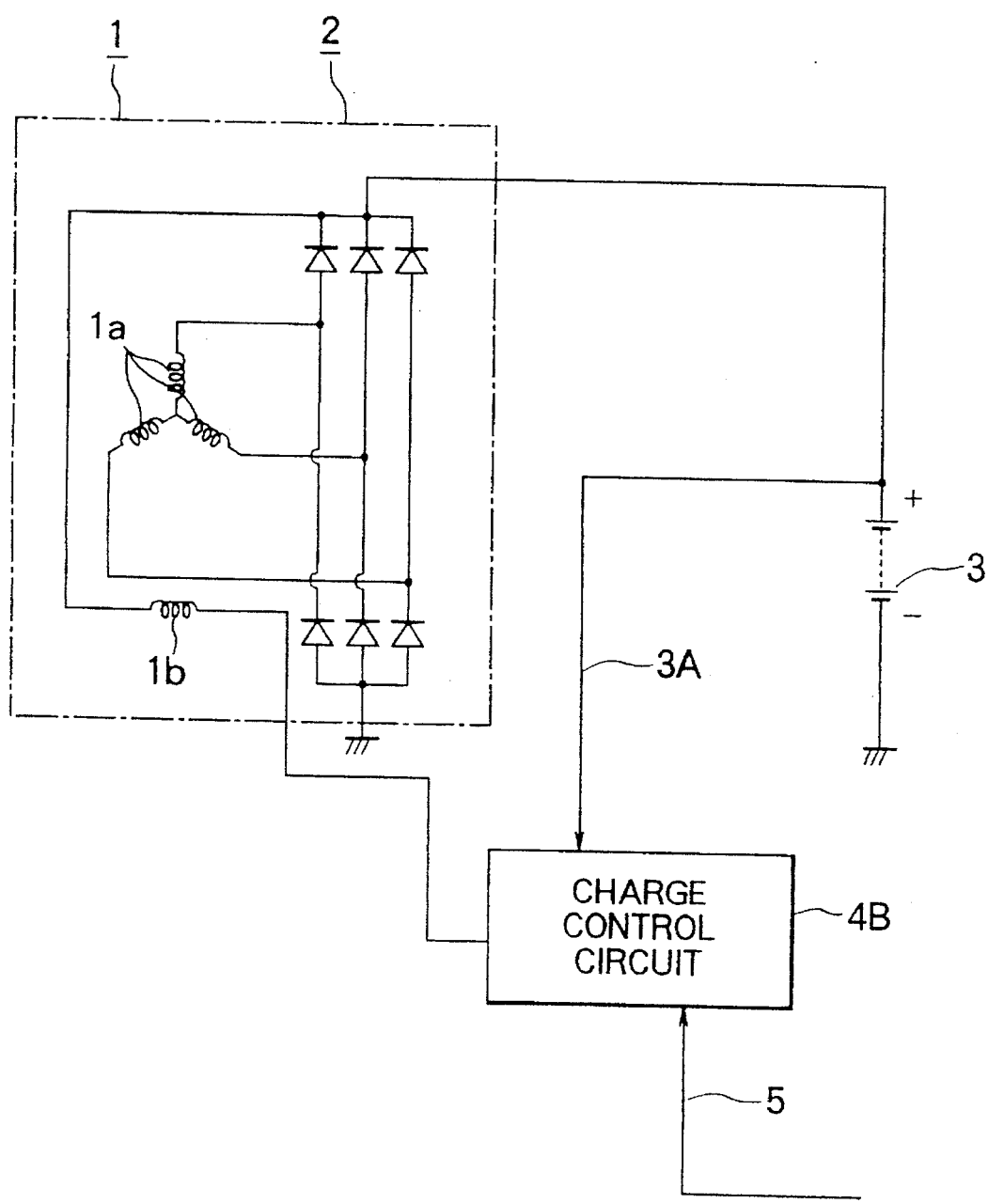
FIG. 5 is a block diagram showing the configuration of an AC generator output controlling apparatus in accordance with another embodiment of the present invention.

FIG. 5 is a block diagram showing the configuration of an AC generator output controlling apparatus in accordance with this embodiment. In FIG. 5, the same reference numerals as those in FIG. 1 respectively denote the same or equivalent portions. In FIG. 5, reference numeral 4B denotes a charge control circuit which forms control means. The charge control circuit 4B determines a control amount of the field current supplied to the field coil 1b of the AC generator 1 on the basis of the voltage deviation $\Delta V$ (i) between the terminal voltage 3A of the battery 3 and the predetermined target voltage of the battery 3. When the voltage deviation $\Delta V$ (i) is lower than the predetermined value $\epsilon 1$, the charge control circuit 4B stops the supply of the field current, and when the voltage deviation $\Delta V$ (i) becomes higher than the predetermined value $\epsilon 1$, the charge control circuit 4B starts the supply of the field current.

Figure 6:
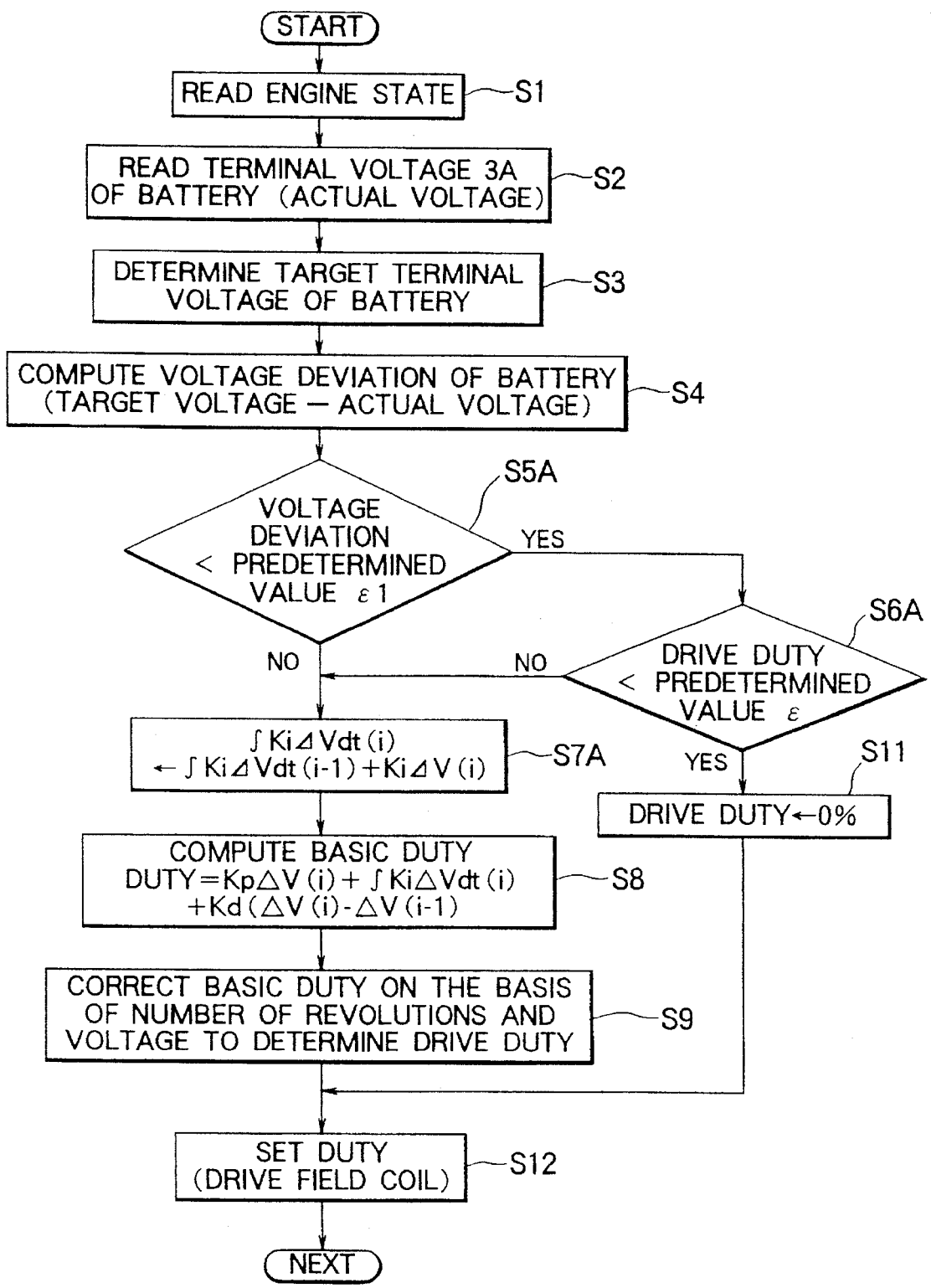
FIG. 6 is a flowchart showing the operation of the other embodiment.

The operation of this embodiment is described below with reference to the flowchart shown in FIG. 6.

The charge control circuit 4B first reads out the engine state of the internal combustion engine, such as the number of revolutions per minute, the idle state, and the intake air temperature, from the engine operating state signals 5 of the internal combustion engine (not shown) (Step S1). The terminal voltage 3A (actual voltage) of the battery 3 is read (Step S2), and an optimum target voltage is then determined on the basis of the electric load of the internal engine and the charging state of the battery 3 according to the engine operating state read out in Step S1 (Step S3).

After the target voltage is determined, the voltage deviation $\Delta V$ (i), i.e., the deviation between the actual voltage read out in Step S2 and the target voltage, is computed (Step S4). The voltage deviation $\Delta V$ (i) is compared with the predetermined value $\epsilon 1$ which indicates a predetermined voltage deviation (Step S5A). When the voltage deviation $\Delta V$ (i) is lower than the predetermined value $\epsilon 1$, the drive duty is compared with the predetermined value $\epsilon$ (Step S6A). When the drive duty is lower than the predetermined value $\epsilon$, the field current is cut off by setting the drive duty to 0% (Step S11), and the operation of the AC generator 1 is substantially stopped (Step S12).

However, if the voltage deviation $\Delta V$ is higher than the predetermined value $\epsilon 1$ in Step S5A, the integral value $(\int Ki\Delta dt\ (i))$ is determined in the same way as in Step S7 shown in FIG. 2 in order to start again the generating operation (Step S7). On the basis of the thus-determined integral value $(\int Ki\Delta dt\ (i))$ of the voltage deviation, the basic duty (Duty) for the field coil 1b is computed by the same method as in Step S8 shown in FIG. 2 according to the PID method.

After the basic duty is computed as described above, the basic duty is corrected on the basis of the number of revolutions per minute read out in Step S1 and the actual voltage read out in Step S2 to determine a drive duty (Step S9).

After the drive duty is set, a field current having a frequency fixed at, for example, 200 Hz, is supplied to the field coil 1b with the set drive duty on the basis of the charging voltage of the battery 3 (Step S12). As a result, when charging becomes necessary, i.e., when the voltage deviation $\Delta V$ becomes lower than the predetermined value $\epsilon 1$, power generation of the AC generator 1 is rapidly started, thereby preventing discharge of the battery 3.

When the drive duty is higher than the predetermined value $\epsilon$ in Step S6A, the flow moves to Step S7, and the above operations of Steps S8, S9 and S10 are then successively performed.

What is claimed is:

1. An AC generator output controlling apparatus comprising:

a generator driven by an internal combustion engine to generate an AC voltage;

a control amount of rectifier for converting the generated AC voltage into a DC voltage;

a battery charged by the converted DC voltage; and control means for determining a field current to be supplied to a field coil of said generator from said battery on the basis of a voltage deviation between a charging voltage of said battery and a target voltage of said battery, and stopping supply of said field current when said control amount is lower than a predetermined value.

2. An AC generator output controlling apparatus comprising:

a generator driven by an internal combustion engine to generate an AC voltage;

a rectifier for converting the generated AC voltage into a DC voltage;

a battery charged by the converted DC voltage; and control means for determining a field current to be supplied to a field coil of said generator from said battery on the basis of a voltage deviation between a charging voltage of said battery and a target voltage of said battery, stopping supply of said field current when said voltage deviation is lower than a predetermined value, and starting the supply of said field current when said voltage deviation becomes higher than said predetermined value after the supply of said field current is stopped.

3. An AC generator output controlling method comprising the steps of:

detecting the terminal voltage of a battery charged by a generator which is driven by an internal combustion engine;

determining a target voltage on the basis of an electric load of said internal combustion engine applied to said battery and the charging state of said battery;

determining a voltage deviation between the charging voltage of said battery and said target voltage;

determining a control amount of the field current supplied to a field coil of said generator from said battery on the basis of said voltage deviation; and stopping the supply of said field current when said control amount is lower than a predetermined value.

4. An AC generator output controlling method comprising the steps of:

detecting the terminal voltage of a battery charged by a generator which is driven by an internal combustion engine;

determining a target voltage on the basis of an electric load of said internal combustion engine applied to said battery and the charging state of said battery;

determining a voltage deviation between the charging voltage of said battery and said target voltage;

determining a control amount of the field current supplied to a field coil of said generator from said battery on the basis of said voltage deviation; and stopping the supply of said field current when said voltage deviation is lower than a predetermined value, and starting the supply of said field current when said voltage deviation becomes higher than the predetermined value after the supply of said field current is stopped.

5. An AC generator output controlling method comprising the steps of:

detecting the operating state of an internal combustion engine;

detecting the terminal voltage of a battery charged by a generator which is driven by said internal combustion engine;

determining a target voltage on the basis of the electric load of said internal combustion engine applied to said battery and the charging state of said battery;

determining a voltage deviation $\Delta V$ (i) between the terminal voltage of said battery and said target voltage;

deciding whether or not the drive duty previously set as described below is 0%;

if the previous drive duty is 0%, replacing the integral value $(\int Ki\Delta Vdt\ (i))$ of the present voltage deviation $\Delta V$ (i) by the integral value $(\int Ki\Delta Vdt\ (i-1))$ of the previous voltage deviation $\Delta V$ (i-1);

if the previous drive duty is not 0%, computing the integral value $(\int Ki\Delta Vdt\ (i))$ of the voltage deviation $\Delta V$ (i) by the following equation:

$$\int Ki\Delta Vdt(i) = \int Ki\Delta Vdt(i-1) + Ki\Delta Vdt(i);$$

computing a basic duty (Duty) for a field coil on the basis of the integral value ($\int Ki\Delta Vdt$ (i)) of said voltage deviation $\Delta V$ (i) by the following equation:

$$Duty = Kp - \Delta V(i) + \int Ki\Delta Vdt(i) + Kd - (\Delta V(i) - \Delta V(i-1))$$

(wherein Kp is a proportional gain, Ki is an integral gain and Kd is a differential gain);

correcting the computed basic duty on the basis of the number of revolutions per minute of said engine and the terminal voltage of said battery to determine a drive duty;

deciding whether or not said drive duty is lower than a predetermined value;

if said drive duty is lower than said predetermined value, setting said drive duty to 0% and substantially stopping the operation of said AC generator by cutting off the field current supplied to said field coil; and if said drive duty is higher than said predetermined value, supplying the field current to said field coil from said battery with the set drive duty.

6. An AC generator output controlling method comprising the steps of:

detecting the operating state of an internal combustion engine;

detecting the terminal voltage of a battery charged by a generator which is driven by said internal combustion engine;

determining an optimum target voltage on the basis of the electric load of said internal combustion engine applied to said battery and the charging state of said battery;

determining a voltage deviation between the terminal voltage of said battery and said target voltage;

comparing said voltage deviation with a first predetermined value;

if said voltage deviation is lower than said first predetermined value, comparing the previous set drive duty with a second predetermined value;

if said previous drive duty is lower than said second predetermined value, setting said drive duty to 0%;

if said voltage deviation is higher than said first predetermined value, or if said drive duty is not 0%, determining the integral value ($\int Ki\Delta Vdt$ (i)) of the present voltage deviation $\Delta V$ (i) by the following equation:

$$\int Ki\Delta Vdt(i) = \int Ki\Delta Vdt(i-1) + Ki\Delta Vdt(i);$$

computing a basic duty (Duty) for a field coil on the basis of the integral value ($\int Ki\Delta Vdt$ (i)) of said voltage deviation $\Delta V$ (i) by the following equation:

$$Duty = Kp - \Delta V(i) + \int Ki\Delta Vdt(i) + Kd - (\Delta V(i) - \Delta V(i-1))$$

(wherein Kp is a proportional gain, Ki is an integral gain and Kd is a differential gain);

correcting the computed basic duty on the basis of the number of revolutions per minute of said engine and the terminal voltage of said battery to determine a drive duty; and supplying the field current to said field coil from said battery with the set drive duty.

* * * * *